(12) United States Patent
Tang et al.

(10) Patent No.: US 11,233,558 B2
(45) Date of Patent: Jan. 25, 2022

(54) BEAM TRACKING METHOD, TERMINAL DEVICE, AND NETWORK-SIDE DEVICE

(71) Applicant: Huawei Technologies Co., Ltd., Shenzhen (CN)

(72) Inventors: Xun Tang, Beijing (CN); Wei Quan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/271,214

(22) Filed: Feb. 8, 2019

(65) Prior Publication Data

US 2019/0238210 A1    Aug. 1, 2019

Related U.S. Application Data

(63) Continuation of application No. PCT/CN2017/096725, filed on Aug. 10, 2017.

(30) Foreign Application Priority Data

Aug. 10, 2016   (CN) .......................... 201610651970.7

(51) Int. Cl.
*H04B 7/08* (2006.01)
*H04B 7/06* (2006.01)
(Continued)

(52) U.S. Cl.
CPC ........... *H04B 7/088* (2013.01); *H04B 7/0695* (2013.01); *H04B 7/0857* (2013.01); *H04B 17/24* (2015.01);
(Continued)

(58) Field of Classification Search
CPC ...... H04B 7/088; H04B 17/309; H04B 17/24; H04B 7/0857; H04L 1/0026; H04W 76/27
See application file for complete search history.

(56) References Cited

U.S. PATENT DOCUMENTS

2010/0033374 A1* 2/2010 van Rensburg ........ H01Q 1/246
                                                                342/368
2010/0291940 A1* 11/2010 Koo ....................... H04B 7/024
                                                                455/450
(Continued)

FOREIGN PATENT DOCUMENTS

| CN | 104955061 A | 9/2015 |
| CN | 105556869 A | 5/2016 |

(Continued)

OTHER PUBLICATIONS

Samsung, "Discussion on Beam Measurement and Tracking for 5G New Radio Interface in mmWave Frequency Bands," 3GPP TSG RAN WG2 #93BIS, R2-162226, Dubrovnik, Croatia; Apr. 11-15, 2016, 6 pages.

(Continued)

*Primary Examiner* — Sam K Ahn
*Assistant Examiner* — Amneet Singh
(74) *Attorney, Agent, or Firm* — Slater Matsil, LLP

(57) ABSTRACT

Embodiments of this application provide a beam tracking method implemented by a terminal device, including: determining, N first beam reference quality values, where the N first beam reference quality values respectively correspond to N beams; selecting, M beams from the N beams based on the N first beam reference quality values and a cell to which each of the N beams belongs, where the M beams belong to a serving cell of the terminal device; and indicating the selected M beams to a network-side device providing a service for the terminal device.

24 Claims, 3 Drawing Sheets

(51) Int. Cl.
  *H04B 17/318* (2015.01)
  *H04W 24/10* (2009.01)
  *H04B 17/24* (2015.01)
  *H04B 17/26* (2015.01)
  *H04B 17/309* (2015.01)
  *H04L 1/00* (2006.01)
  *H04W 16/28* (2009.01)
  *H04W 76/27* (2018.01)

(52) U.S. Cl.
  CPC .......... *H04B 17/26* (2015.01); *H04B 17/309* (2015.01); *H04B 17/318* (2015.01); *H04L 1/0026* (2013.01); *H04W 24/10* (2013.01); *H04W 16/28* (2013.01); *H04W 76/27* (2018.02)

(56) References Cited

U.S. PATENT DOCUMENTS

| | | | | |
|---|---|---|---|---|
| 2013/0315083 | A1* | 11/2013 | Jung | H04W 56/00 370/252 |
| 2016/0150435 | A1 | 5/2016 | Baek et al. | |
| 2016/0192401 | A1* | 6/2016 | Park | H04W 72/046 370/329 |
| 2017/0012692 | A1 | 1/2017 | Kim et al. | |
| 2017/0207843 | A1* | 7/2017 | Jung | H04B 7/0408 |
| 2017/0214505 | A1* | 7/2017 | Zhang | H04L 1/06 |
| 2017/0238294 | A1* | 8/2017 | Lim | H04B 7/0695 370/277 |
| 2018/0123675 | A1 | 5/2018 | Shi et al. | |

FOREIGN PATENT DOCUMENTS

| | | |
|---|---|---|
| CN | 105723639 A | 6/2016 |
| CN | 105790886 A | 7/2016 |
| WO | 2015080646 A1 | 6/2015 |
| WO | 2015126130 A1 | 8/2015 |
| WO | 2015141065 A1 | 9/2015 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.0.0, (Jan. 2016), 508 pages.

Samsung, "Discussion on Beam Measurement for 5G New Radio Interface in mmWave Frequency Bands," 3GPP TSG RAN WG2 #94, R2-163652, Nanjing, China, May 23-27, 2016, 4 pages.

Mediatek Inc., "RAN2 Impacts in HF-NR," 3GPP TSG-RAN WG2 #94 R2-163879, Nanjing, China, May 23-27, 2016, 5 pages.

3rd Generation Partnership Project; Technical Specification Group Radio Access Network; Study on New Radio (NR) Access Technology; Physical Layer Aspects (Release 14), 3GPP TR 38.802 V0.1.0 (Aug. 2016), 31 pages.

* cited by examiner

BEAM TRACKING METHOD, TERMINAL DEVICE, AND NETWORK-SIDE DEVICE

CROSS-REFERENCE TO RELATED APPLICATIONS

This application is a continuation of International Application No. PCT/CN2017/096725, filed on Aug. 10, 2017, which claims priority to Chinese Patent Application No. 201610651970.7, filed on Aug. 10, 2016. The disclosures of the aforementioned applications are hereby incorporated by reference in their entireties.

TECHNICAL FIELD

Embodiments of this application relate to the field of wireless communications technologies, and more specifically, to a beam tracking method, a terminal device, and a network-side device.

BACKGROUND

As wireless communications technologies develop, low frequency bands in spectrum resources are gradually saturated. A large segment of continuous available spectrum in a low frequency band is difficult to find. Therefore, more high frequency bands are used in communications systems. It can be known according to a formula of a wireless spatial path loss that a path loss is in direct proportion to a frequency and a distance. After a frequency used by a communications device rises, a path loss increases at a same distance. In addition, on the premise that a transmitter and a receiver remain unchanged, a value of a maximum path loss that can be borne by an entire radio link is fixed. Therefore, when the frequency used by the communications device rises, an effective communication distance between communications devices is bound to decrease. According to the principle, use of a high-frequency spectrum causes a decrease in coverage of a cell. When a requirement for a coverage area is the same, the decrease in the coverage of the cell results in that more base station devices are required to complete coverage, thereby increasing network deployment costs. In addition, the decrease in the coverage of the cell also causes frequent inter-cell handovers, thereby decreasing user experience.

The problem that the coverage of the high-frequency cell decreases can be desirably resolved using a beamforming technology. Beamforming is a multi-antenna transmission/reception technology. A narrow beam is formed by combining signals on a plurality of antennas, to obtain a transmission/reception gain. Therefore, the coverage of the cell can be effectively expanded.

Currently, the beamforming technology is used only for a data channel. A terminal device establishes communication with a network-side device in a conventional manner (for example, using a wide beam). After the communication is established, data may be transmitted between the terminal device and the network-side device using the beamforming technology. In a high-frequency cell, transmission on all channels (including a control channel, a random access channel, and the like) needs to be performed using a beam. A key problem that needs to be resolved is how to keep the beam aligned, that is, tracking the beam when a channel changes and the terminal device moves.

SUMMARY

Embodiments of this application provide a beam tracking method, a terminal device, and a network-side device, to transmit information of all channels using a beamforming technology.

According to a first aspect, an embodiment of this application provides a beam tracking method. The method includes determining, by a terminal device, N first beam reference quality values, where the N first beam reference quality values respectively correspond to N beams, and N is a positive integer greater than or equal to 1. The method also includes selecting, by the terminal device, M beams from the N beams based on the N first beam reference quality values and a cell to which each of the N beams belongs, where M is a positive integer greater than or equal to 1 and less than or equal to N, and the M beams belong to a cell to be camped on by the terminal device or a serving cell of the terminal device. The method also includes indicating, by the terminal device, the selected M beams to a network-side device providing a service for the terminal device. In the foregoing technical solution, the terminal device may track a beam that can be detected, and report the tracked beam of the cell to be camped on or the serving cell to the network-side device, so that the network-side device can select, from the reported beam, a proper beam as a beam used to communicate with the terminal device.

With reference to the first aspect, in a first possible implementation of the first aspect, the indicating, by the terminal device, the selected M beams to a network-side device includes: sending, by the terminal device, a first beam tracking message to the network-side device, where the first beam tracking message includes indexes of the M beams, and the first beam tracking message is a Media Access Control (MAC) layer message. In this way, the terminal device may directly indicate the selected M beams to the network-side device using the MAC layer message.

With reference to the first aspect or the foregoing possible implementation of the first aspect, in a second possible implementation of the first aspect, the method further includes: sending, by the terminal device, a random access preamble to the network-side device on a time-frequency resource and/or a code resource corresponding to an index of a first target beam, where the first target beam is a beam of the M beams that has a largest first beam reference quality value. In this way, the terminal device may implicitly indicate the beam having the largest first beam quality value to the network-side device using the time-frequency resource and/or the code resource of the random access preamble, without a need of using extra signaling. In this way, signaling overheads can be reduced.

With reference to any one of the first aspect or the foregoing possible implementations of the first aspect, in a third possible implementation of the first aspect, the method further includes: determining, by the terminal device, N second beam reference quality values, where an $n^{th}$ second beam reference quality value of the N second beam reference quality values is determined based on an $n^{th}$ first beam reference quality value of the N first beam reference quality values, and n=1, . . . , or N; determining, by the terminal device, a second beam tracking message based on the N second beam reference quality values; and sending, by the terminal device, the second beam tracking message to the network-side device, where the second beam tracking message is a radio resource control (RRC) layer message. In the foregoing technical solution, the terminal device may determine a second beam reference quality value of each beam based on a plurality of first beam reference quality values of each beam. In this way, a reference quality value of the beam tracked by the terminal device is a measurement result obtained after accumulation in a period of time. In addition, the second beam tracking message may include an index of a beam of at least one of cells to which the N beams belong. In this way, the network-side device may obtain a beam quality value of the cell to be camped on and a beam quality value of a neighboring cell of the terminal device. In this case, the network-side device can not only determine a cell status of the cell to be camped on by the terminal device or the serving cell of the terminal device, but also determine a cell status of the neighboring cell that can be detected by the terminal device.

With reference to the third possible implementation of the first aspect, in a fourth possible implementation of the first aspect, the determining, by the terminal device, a second beam tracking message based on the N second beam reference quality values includes: determining, by the terminal device, the second beam tracking message based on the N second beam reference quality values, the cell to which each of the N beams belongs, a first preset threshold, and a second preset threshold, where the first preset threshold is greater than the second preset threshold, the second beam tracking message includes an index of a candidate beam and/or an index of an available beam, a second beam reference quality value of the candidate beam is greater than or equal to the first preset threshold, and a second beam reference quality value of the available beam is less than the first preset threshold and is greater than or equal to the second preset threshold. In the foregoing technical solution, the terminal device directly reports the candidate beam and/or the available beam to the network-side device, so that the network-side device may select a proper beam from the received candidate beam and/or available beam to communicate with the terminal device.

With reference to the fourth possible implementation of the first aspect, in a fifth possible implementation of the first aspect, the second beam tracking message further includes the second beam reference quality value of the candidate beam and/or the second beam reference quality value of the available beam.

With reference to the third possible implementation of the first aspect, in a sixth possible implementation of the first aspect, the determining, by the terminal device, a second beam tracking message based on the N second beam reference quality values includes: determining, by the terminal device, the second beam tracking message based on the N second beam reference quality values, the cell to which each of the N beams belongs, and a third preset threshold, where the second beam tracking message includes indexes of P beams, a second beam reference quality value of each of the P beams is greater than or equal to the third preset threshold, and P is a positive integer greater than or equal to 1 and less than or equal to M. In the foregoing technical solution, the terminal device may directly report an index of a beam meeting a preset condition (to be specific, being greater than or equal to the third preset threshold) to the network-side device, so that the network-side device may directly select a proper beam from the beam meeting the preset condition, to communicate with the terminal device.

With reference to the sixth possible implementation of the first aspect, in a seventh possible implementation of the first aspect, the second beam tracking message further includes a second beam reference quality value of the N beams that is greater than the third preset threshold.

With reference to the third possible implementation of the first aspect, in an eighth possible implementation of the first aspect, the determining, by the terminal device, a second beam tracking message based on the N second beam reference quality values includes: determining, by the terminal device based on the N second beam reference quality values and the cell to which each of the N beams belongs, at least two reference beams of each of at least one of the cells to which the N beams belong, where the at least two reference beams of each cell are at least two beams of each cell that have largest second beam reference quality values; and determining, by the terminal device, the second beam tracking message, where the second beam tracking message includes indexes of the determined at least two reference beams of each cell. In the foregoing technical solution, the terminal device may directly report a plurality of beams having largest second beam reference quality values to the network-side device, so that the network-side device may select, from the plurality of beams having largest second beam quality values, a beam that may be used to communicate with the terminal device.

With reference to the eighth possible implementation of the first aspect, in a ninth possible implementation of the first aspect, the second beam tracking message further includes the second beam reference quality values of the at least two reference beams of each cell.

With reference to the third possible implementation of the first aspect, in a tenth possible implementation of the first aspect, the determining, by the terminal device, a second beam tracking message based on the N second beam reference quality values includes: determining, by the terminal device, a cell measurement result based on the N second beam reference quality values and the cell to which each of the N beams belongs, where the cell measurement result is a largest second beam reference quality value of each of at least one of the cells to which the N beams belong; and determining, by the terminal device, the second beam tracking message, where the second beam tracking message includes the cell measurement result. In the foregoing technical solution, the terminal device may determine the cell measurement result based on a beam tracking result, and report the cell measurement result obtained through measurement to the network-side device, so that the network-side device obtains, in a timely manner, the cell measurement result obtained by the terminal device through tracking.

With reference to the third possible implementation of the first aspect, in an eleventh possible implementation of the first aspect, the determining a second beam tracking message based on the N second beam reference quality values includes: determining, by the terminal device based on the N second beam reference quality values and the cell to which each of the N beams belongs, at least two reference beams of each of at least one of the cells to which the N beams belong, where the at least two reference beams of each cell are at least two beams of each cell that have largest second beam reference quality values; determining, by the terminal device, a cell measurement result, where the cell measurement result includes an average value of the second beam reference quality values of the at least two reference beams of each cell; and determining, by the terminal device, the second beam tracking message, where the second beam tracking message includes the cell measurement result. In the foregoing technical solution, the terminal device may determine the cell measurement result based on a beam tracking result, and report the cell measurement result obtained through measurement to the network-side device, so that the network-side device obtains, in a timely manner, the cell measurement result obtained by the terminal device through tracking.

With reference to the first aspect, the first possible implementation of the first aspect, or the second possible implementation of the first aspect, in a twelfth possible implementation of the first aspect, the method further includes: determining, by the terminal device based on the N first beam reference quality values and the cell to which each of the N beams belongs, a largest first beam reference quality value of each of at least one of cells to which the N beams belong; determining, by the terminal device, a second beam reference quality value of each cell based on the largest first beam reference quality value of each cell; and using, by the terminal device, the second beam reference quality value of each cell as a cell measurement result, and sending the second beam reference quality value to the network-side device via an RRC layer message. In the foregoing technical solution, the terminal device may determine the cell measurement result based on a beam tracking result, and report the cell measurement result obtained through measurement to the network-side device, so that the network-side device obtains, in a timely manner, the cell measurement result obtained by the terminal device through tracking.

With reference to the first aspect, the first possible implementation of the first aspect, or the second possible implementation of the first aspect, in a thirteenth possible implementation of the first aspect, the method further includes: determining, by the terminal device based on the N first beam reference quality values and the cell to which each of the N beams belongs, an average value of at least two largest first beam reference quality values of each of at least one of cells to which the N beams belong; determining, by the terminal device, second beam reference quality of each cell based on the average value of the at least two largest first beam reference quality values of each cell; and using, by the terminal device, the second beam reference quality of each cell as a cell measurement result, and sending the second beam reference quality to the network-side device via an RRC layer message. In the foregoing technical solution, the terminal device may determine the cell measurement result based on a beam tracking result, and report the cell measurement result obtained through measurement to the network-side device, so that the network-side device obtains, in a timely manner, the cell measurement result obtained by the terminal device through tracking.

With reference to any one of the tenth possible implementation of the first aspect to the thirteenth possible implementation of the first aspect, in a fourteenth possible implementation of the first aspect, the method further includes: determining, by the terminal device based on the cell measurement result, whether a preset measurement event is met. In the foregoing technical solution, the terminal device may determine, based on the beam tracking result, whether the preset measurement event is met, so as to select to-be-reported content based on a determining result.

With reference to any one of the first aspect or the foregoing possible implementations of the first aspect, in a fifteenth possible implementation of the first aspect, a value of M is indicated by the network-side device to the terminal device.

According to a second aspect, an embodiment of this application provides a beam tracking method. The method includes obtaining, by a network-side device, M beams indicated by a terminal device, where the M beams belong to a cell to be camped on by the terminal device or a serving cell of the terminal device, and M is a positive integer greater than or equal to 1. The method also includes selecting, by the network-side device, a beam from the M beams. The method also includes sending, by the network-side device, a downlink message to the terminal device using the selected beam. In the foregoing technical solution, the network-side device may obtain a beam that is tracked by the terminal device and that belongs to the cell to be camped on by the terminal device or the serving cell of the terminal device.

With reference to the second aspect, in a first possible implementation of the second aspect, the obtaining, by a network-side device, M beams indicated by a terminal device includes: receiving, by the network-side device, a first beam tracking message sent by the terminal device, where the first beam tracking message includes indexes of the M beams, and the first beam tracking message is a MAC layer message. In the foregoing technical solution, the network-side device may directly obtain the M beams indicated by the terminal device.

With reference to the second aspect or the first possible implementation of the second aspect, in a second possible implementation of the second aspect, the method further includes: receiving, by the network-side device, a random access preamble sent by the terminal device; and determining, by the network-side device, a first target beam based on a time-frequency resource and/or a code resource of the random access preamble, where the first target beam is a beam of the M beams that has a largest first beam reference quality value. In the foregoing technical solution, the network-side device may determine the first target beam based on an implicit indication of the terminal device. The network-side device may determine the first target beam without a need of receiving extra signaling. In this way, signaling overheads can be reduced.

With reference to any one of the second aspect or the foregoing possible implementations of the second aspect, in a third possible implementation of the second aspect, the method further includes: receiving, by the network-side device, a second beam tracking message sent by the terminal device, where the second beam tracking message is an RRC layer message, the second beam tracking message includes an index of a candidate beam and/or an index of an available beam, a second beam reference quality value of the candidate beam is greater than or equal to a first preset threshold, a second beam reference quality value of the available beam is less than the first preset threshold and is greater than or equal to a second preset threshold, and the first preset threshold is greater than the second preset threshold. In the foregoing technical solution, the network-side device may directly determine the candidate beam and/or the available beam based on the beam tracking message sent by the terminal device, and does not need to voluntarily determine the candidate beam and/or the available beam based on the preset threshold. In this way, resources of the network-side device can be saved.

With reference to the third possible implementation of the second aspect, in a fourth possible implementation of the second aspect, the second beam tracking message further includes the second beam reference quality value of the candidate beam and/or the second beam reference quality value of the available beam.

With reference to the second aspect, the first possible implementation of the second aspect, or the second possible implementation of the second aspect, in a fifth possible implementation of the second aspect, the method further includes: receiving, by the network-side device, a second beam tracking message sent by the terminal device, where the second beam tracking message is an RRC layer message, the second beam tracking message includes indexes of P beams, a second beam reference quality value of each of the P beams is greater than or equal to a third preset threshold, and P is a positive integer greater than or equal to 1 and less than or equal to M. In the foregoing technical solution, the network-side device may directly determine, based on the beam tracking message sent by the terminal device, the beam whose second beam reference quality value is greater than or equal to the third preset threshold, and does not need to voluntarily determine, based on the preset threshold, the beam meeting the foregoing condition. In this way, resources of the network-side device can be saved.

With reference to the fifth possible implementation of the second aspect, in a sixth possible implementation of the second aspect, the second beam tracking message further includes a second beam reference quality value of at least one beam.

With reference to the second aspect, the first possible implementation of the second aspect, or the second possible implementation of the second aspect, in a seventh possible implementation of the second aspect, the method further includes: receiving, by the network-side device, a second beam tracking message sent by the terminal device, where the second beam tracking message is an RRC layer message, the second beam tracking message includes indexes of at least two reference beams belonging to each of at least one cell, and the at least two reference beams of each cell are at least two beams of each cell that have largest second beam reference quality values. In the foregoing technical solution, the network-side device may directly determine, based on the beam tracking message sent by the terminal device, a plurality of beams of each of the at least one cell that have largest second beam reference quality, and does not need to voluntarily determine the plurality of beams of each of the at least one cell that have the largest second beam reference quality. In this way, resources of the network-side device can be saved.

With reference to the seventh possible implementation of the second aspect, in an eighth possible implementation of the second aspect, the second beam tracking message further includes the second beam reference quality values of the at least two reference beams of each cell.

With reference to the second aspect, the first possible implementation of the second aspect, or the second possible implementation of the second aspect, in a ninth possible implementation of the second aspect, the method further includes: receiving, by the network-side device, a second beam tracking message sent by the terminal device, where the second beam tracking message is an RRC layer message, the second beam tracking message includes a cell measurement result, and the cell measurement result is a largest second beam reference quality value of each of at least one cell. In the foregoing technical solution, the network-side device may directly obtain the cell measurement result reported by the terminal device, and does not need to voluntarily determine the cell measurement result. In this way, resources of the network-side device can be saved.

With reference to the second aspect, the first possible implementation of the second aspect, or the second possible implementation of the second aspect, in a tenth possible implementation of the second aspect, the method further includes: receiving, by the network-side device, a second beam tracking message sent by the terminal device, where the second beam tracking message is an RRC layer message, the second beam tracking message includes a cell measurement result, the cell measurement result includes an average value of second beam reference quality values of at least two reference beams of each of at least one cell, and the at least two reference beams of each cell are at least two beams of each cell that have largest second beam reference quality values. In the foregoing technical solution, the network-side device may directly obtain the cell measurement result reported by the terminal device, and does not need to voluntarily determine the cell measurement result. In this way, resources of the network-side device can be saved.

With reference to the second aspect, the first possible implementation of the second aspect, or the second possible implementation of the second aspect, in an eleventh possible implementation of the second aspect, the method further includes: receiving, by the network-side device, a cell measurement result of each of at least one cell sent by the terminal device, where the cell measurement result of each cell includes a second beam reference quality value of each cell, and the second beam reference quality value of each cell is determined based on a largest first beam reference quality value of each cell. In the foregoing technical solution, the network-side device may directly obtain the cell measurement result reported by the terminal device, and does not need to voluntarily determine the cell measurement result. In this way, resources of the network-side device can be saved.

With reference to the second aspect, the first possible implementation of the second aspect, or the second possible implementation of the second aspect, in a twelfth possible implementation of the second aspect, the method further includes: receiving, by the network-side device, a cell measurement result of each of at least one cell sent by the terminal device, where the cell measurement result of each cell is a second beam reference quality value of each cell, and the second beam reference quality of each cell is determined based on an average value of at least two largest first beam reference quality values of each cell.

With reference to any one of the second aspect or the foregoing possible implementations of the second aspect, in a thirteenth possible implementation of the second aspect, a value of M is indicated by the network-side device to the terminal device.

According to a third aspect, an embodiment of this application provides a beam tracking method. The method includes: sending, by a terminal device, a beam training request to a network-side device using a first beam. The method also includes determining, by the terminal device based on a beam training response sent by the network-side device, a second beam used to communicate with the network-side device, where the beam training response includes M physical pilot resources, and M is a positive integer greater than or equal to 1. In the foregoing technical solution, the terminal device may select a proper beam from a plurality of available beams, to communicate with the network-side device.

With reference to the third aspect, in a first possible implementation of the third aspect, before the sending, by a terminal device, a beam training request to a network-side device using a first beam, the method further includes: sending, by the terminal device, a random access preamble to the network-side device on N time-frequency resources by respectively using N beams, where subframe numbers and/or frequency resource numbers of any two of the N time-frequency resources are different, and N is a positive integer greater than or equal to 2; receiving, by the terminal device, at least one random access response message sent by the network-side device; and determining, by the terminal device, the first beam from the N beams based on a value of an RA-RNTI in each of the at least one random access response message. In the foregoing technical solution, the terminal device may select, from a plurality of available beams, a beam that may be used to communicate with the network-side device, so as to send a request message to the network-side device using the beam.

With reference to the third aspect or the first possible implementation of the third aspect, in a second possible implementation of the third aspect, the determining, by the terminal device based on a beam training response sent by the network-side device, a second beam used to communicate with the network-side device includes: sending, by the terminal device, a reference signal to the network-side device on the M physical pilot resources by respectively using M beams; receiving, by the terminal device, feedback information sent by the network-side device, where the feedback information includes indexes of one or more of the M beams; and determining, by the terminal device, the second beam based on the feedback information, where the second beam belongs to the one or more beams. In the foregoing technical solution, the terminal device may train an available beam and determine, based on the information fed back by the network-side device, the beam that can be used to communicate with the network-side device.

With reference to the second possible implementation of the third aspect, in a third possible implementation of the third aspect, before the sending, by the terminal device, a reference signal to the network-side device on the M physical pilot resources by respectively using M beams, the method further includes: selecting, by the terminal device, the M beams from a plurality of available beams. In the foregoing technical solution, the terminal device may select a proper quantity of beams used for training, so that the quantity of beams used for training is equal to a quantity of physical pilot resources that are allocated by the network-side device to the terminal device and that is used to perform beam training.

With reference to any one of the third aspect or the foregoing possible implementations of the third aspect, in a fourth possible implementation of the third aspect, before the determining, by the terminal device based on a beam training response sent by the network-side device, a second beam used to communicate with the network-side device, the method further includes: indicating, by the terminal device, a quantity of available sending beams of the terminal device to the network-side device. In the foregoing technical solution, the terminal device may send the quantity of available beams to the network-side device, so that the network-side device determines, based on the quantity of available beams, a quantity of physical pilot resources that need to be allocated to the terminal device.

According to a fourth aspect, an embodiment of this application provides a beam tracking method. The method includes: receiving, by a network-side device, a beam training request sent by a terminal device; and sending, by the network-side device, a beam training response to the terminal device, where the beam training response includes M physical pilot resources, and M is a positive integer greater than or equal to 1. In the foregoing technical solution, the network-side device may allocate, to the terminal device, a physical pilot resource used to perform beam training, so that the terminal device selects a proper beam based on the physical pilot resource, to communicate with the network-side device.

With reference to the fourth aspect, in a first possible implementation of the fourth aspect, before the receiving, by a network-side device, a beam training request sent by a terminal device, the method further includes: receiving, by the network-side device, N random access preambles sent by the terminal device, where N is a positive integer greater than or equal to 1; determining, by the network-side device, values of N RA-RNTIs based on a time-frequency resource of each of the N random access preambles; and sending, by the network-side device, N random access responses to the terminal device, where the N random access responses are respectively scrambled based on the values of the N RA-RNTIs. In the foregoing technical solution, the network-side device feeds back an available uplink beam to the terminal device, so that the terminal device sends the beam training request to the network-side device using the uplink beam.

With reference to the fourth aspect or the first possible implementation of the fourth aspect, in a second possible implementation of the fourth aspect, the method further includes: receiving, by the network-side device, a reference signal that is sent by the terminal device on the M physical pilot resources by respectively using M beams; determining, by the network-side device, a beam quality value of each of the M beams based on the received reference signal; and determining, by the network-side device, feedback information based on the beam quality value of each beam, where the feedback information includes indexes of one or more of the M beams. In the foregoing technical solution, the network-side device may feed back, to the terminal device, one or more beams that may be used by the terminal device and that are used to communicate with the network-side device, so that the terminal device selects a proper beam from the one or more beams to communicate with the network-side device.

With reference to the second possible implementation of the fourth aspect, in a third possible implementation of the fourth aspect, the determining, by the network-side device, feedback information based on the beam quality value of each beam includes: determining, by the network-side device based on the beam quality value of each beam, that the feedback information includes indexes of one or more beams having largest beam quality values; or determining, by the network-side device based on the beam quality value of each beam, that the feedback information includes indexes of one or more beams whose beam quality values are greater than a preset threshold. In the foregoing technical solution, the network-side device may directly feed back a beam meeting a specific condition to the terminal device, so that the terminal device may directly determine an available uplink beam based on the feedback information. The terminal device does not need to voluntarily determine the beam meeting the specific condition. In this way, resources of the terminal device can be saved.

With reference to any one of the fourth aspect or the foregoing possible implementations of the fourth aspect, in a fourth possible implementation of the fourth aspect, before the sending, by the network-side device, a beam training response to the terminal device, the method further includes: receiving, by the network-side device, a quantity of available sending beams that is sent by the terminal device; and determining, by the network-side device, the quantity M of physical pilot resources based on the quantity of available sending beams, where M is less than or equal to the quantity of available sending beams. In the foregoing technical solution, the network-side device allocates a proper quantity of physical pilot resources to the terminal device, so that the quantity of physical pilot resources is the same as the quantity of available sending beams of the terminal device.

According to a fifth aspect, an embodiment of this application provides a terminal device. The terminal device includes various units configured to implement the method in any one of the first aspect or the possible implementations of the first aspect.

According to a sixth aspect, an embodiment of this application provides a network-side device. The network-side device includes various units configured to implement the method in any one of the second aspect or the possible implementations of the second aspect.

According to a seventh aspect, an embodiment of this application provides a terminal device. The terminal device includes various units configured to implement the method in any one of the third aspect or the possible implementations of the third aspect.

According to an eighth aspect, an embodiment of this application provides a network-side device. The network-side device includes various units configured to implement the method in any one of the fourth aspect or the possible implementations of the fourth aspect.

According to a ninth aspect, an embodiment of this application provides a computer readable storage medium. The computer readable storage medium stores an instruction used to implement the method in any one of the first aspect or the possible implementations of the first aspect.

According to a tenth aspect, an embodiment of this application provides a terminal device. The terminal device includes a memory and a processor. The memory includes the computer readable storage medium in the ninth aspect. The processor is configured to execute the instruction stored in the computer readable storage medium.

According to an eleventh aspect, an embodiment of this application provides a computer readable storage medium. The computer readable storage medium stores an instruction used to implement the method in any one of the second aspect or the possible implementations of the second aspect.

According to a twelfth aspect, an embodiment of this application provides a terminal device. The terminal device includes a memory and a processor. The memory includes the computer readable storage medium in the eleventh aspect. The processor is configured to execute the instruction stored in the computer readable storage medium.

According to a thirteenth aspect, an embodiment of this application provides a computer readable storage medium. The computer readable storage medium stores an instruction used to implement the method in any one of the third aspect or the possible implementations of the third aspect.

According to a fourteenth aspect, an embodiment of this application provides a terminal device. The terminal device includes a memory and a processor. The memory includes the computer readable storage medium in the thirteenth aspect. The processor is configured to execute the instruction stored in the computer readable storage medium.

According to a fifteenth aspect, an embodiment of this application provides a computer readable storage medium. The computer readable storage medium stores an instruction used to implement the method in any one of the fourth aspect or the possible implementations of the fourth aspect.

According to a sixteenth aspect, an embodiment of this application provides a terminal device. The terminal device includes a memory and a processor. The memory includes the computer readable storage medium in the fifteenth aspect. The processor is configured to execute the instruction stored in the computer readable storage medium.

DETAILED DESCRIPTION OF ILLUSTRATIVE EMBODIMENTS

The following describes technical solutions of this application with reference to accompanying drawings.

It should be understood that the technical solutions in embodiments of this application may be applied to various communications systems supporting a beamforming technology, such as a Long Term Evolution (LTE) system, an LTE frequency division duplex (FDD) system, an LTE time division duplex (TDD) system, a $5^{th}$ generation (5G) communications system, and new radio (NR).

A terminal device, which may also be referred to as user equipment (UE), a mobile terminal (MT), mobile user equipment, or the like, may communicate with one or more core networks using a radio access network (RAN). The user equipment may be a mobile terminal, such as a mobile phone (or referred to as a "cellular" phone) and a computer with a mobile terminal, for example, may be a portable, pocket-sized, handheld, computer built-in, or in-vehicle mobile apparatus.

A network-side device may be an eNB or an eNodeB in LTE, or may be a base station or a transmission reception point (TRP) in 5G or NR. This is not limited in this application.

A cell to be camped on may also be referred to as a serving cell or a current cell. The terminal device may select a cell, and listen to a system message and a paging message in the cell. The cell selected by the terminal device is the cell to be camped on by the terminal device. In addition to the selected cell to be camped on, the terminal device may further detect another cell. The another cell may be referred to as a neighboring cell of the terminal device.

Figure 1:
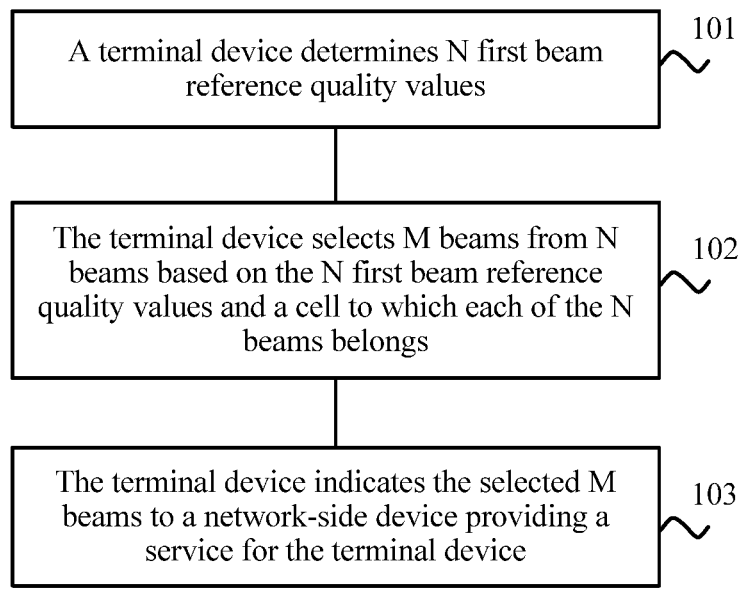
FIG. 1 is a schematic flowchart of a beam tracking method according to an embodiment of this application.

FIG. 1 is a schematic flowchart of a beam tracking method according to an embodiment of this application.

101. A terminal device determines N first beam reference quality values, where the N first beam reference quality values respectively correspond to N beams, and N is a positive integer greater than or equal to 1.

The terminal device may determine a working frequency in a cell search phase. The terminal may detect N beams at the working frequency, and the N beams may belong to different cells. For example, the N beams may include one or more beams belonging to a cell to be camped on by the terminal device. Alternatively, the N beams may include one or more beams that do not belong to a neighboring cell of the terminal device. The terminal device may have at least one neighboring cell, and each neighboring cell corresponds to a beam. In this embodiment of this application, "a cell to which a beam belongs" is a cell that a network-side device provides a service for the cell and uses a beam in it. "A beam corresponding to a cell" is a beam used in the cell by a network-side device providing a service for the cell. For example, a network-side device 1 uses a beam 1, a beam 2, and a beam 3 in a cell A, and a network-side device 2 uses a beam 4, a beam 5, and a beam 6 in a cell B. Therefore, it may be said that the beam 1 to the beam 3 belong to the cell A, the beam 4 to the beam 6 belong to the cell B, beams corresponding to the cell A are the beam 1 to the beam 3, and beams corresponding to the cell B are the beam 4 to the beam 6. It may be understood that one network-side device may provide a service for one or more cells, or may provide a service only for one cell. This is not limited in this application.

After detecting the N beams, the terminal device may determine a first beam reference quality value of each of the N beams.

Optionally, in some embodiments, the first beam reference quality value of each beam may be determined based on a receive power for receiving a reference signal sent by each beam, for example, may be a reference signal received power (RSRP), or may be reference signal received quality (RSRQ). Therefore, it may be understood that the first beam reference quality value is a beam quality value obtained through physical layer measurement.

Optionally, in some embodiments, the first beam reference quality value of each beam may be determined by performing filtering based on a historical first beam reference quality value and a current beam quality value of each beam. Specifically, the first beam reference quality value may be determined using the following formula:

$$F_t = (1-a) \cdot F_{t-1} + a \cdot M_t \quad \text{(Formula 1.1)}$$

where $F_t$ is a first beam reference quality value of the beam during $t^{th}$ measurement, $M_t$ is current beam quality, $F_{t-1}$ is a first beam reference quality value of the beam during $(t-1)^{th}$ measurement, and a is a filtering coefficient. The filtering coefficient may be preset, or may be indicated by the network-side device to the terminal device. This is not limited in this embodiment of this application. It may be understood that a value of a may be any value between 0 and 1 (including 0 and 1), and a smaller value of a indicates a lower weight of the current beam quality. For example, in some embodiments, a=0.1. The current beam quality value is a beam quality value obtained through physical layer measurement. For example, the current beam quality value may be an RSRP or RSRQ.

Optionally, filtering may be performed at a Media Access Control (MAC) layer based on a physical layer measurement result, and reporting is performed based on the filtering. To be specific, the first beam reference quality value is a result obtained after filtering is performed at the MAC layer.

102. The terminal device selects M beams from the N beams based on the N first beam reference quality values and a cell to which each of the N beams belongs, where M is a positive integer greater than or equal to 1 and less than or equal to N, and the M beams belong to a cell to be camped on by the terminal device.

Optionally, in some embodiments, the terminal device may determine, from the N beams, at least one beam belonging to the cell to be camped on, and then determine the M beams having largest first beam reference quality values from the at least one beam. A value of M may be preset, or may be indicated by the network-side device to the terminal device. It may be understood that, if a quantity of beams that are determined by the terminal device and that belong to the cell to be camped on is less than a preset value or a value indicated by the network-side device, the M beams are all beams that are determined by the terminal device and that belong to the cell to be camped on.

Optionally, in some embodiments, the terminal device may determine, from the N beams, at least one beam belonging to the cell to be camped on, and then determine, from the at least one beam, one or more beams whose first beam reference quality values are greater than a preset threshold. The preset threshold may be preset, or may be indicated by the network-side device to the terminal device.

Optionally, in some embodiments, the terminal device may determine, from the N beams, at least one beam belonging to the cell to be camped on, and then determine, from the at least one beam, one or more beams whose first beam reference quality values are greater than a preset threshold. The terminal device may determine the M beams having largest first beam reference quality values from the one or more beams whose first beam reference quality values are greater than the preset threshold. The preset threshold may be preset in the terminal device, or may be indicated by the network-side device to the terminal device. A value of M may be preset, or may be indicated by the network-side device to the terminal device. It may be understood that, if a quantity of beams that are determined by the terminal device, that belong to the cell to be camped on, and whose first beam reference quality values are greater than the preset threshold is less than the preset value or the value indicated by the network-side device, the M beams are all beams that are determined by the terminal device, that belong to the cell to be camped on, and whose first beam reference quality values are greater than the preset threshold.

103. The terminal device indicates the selected M beams to a network-side device providing a service for the terminal device.

Each beam detected by the terminal device corresponds to one index. The terminal device may send indexes of the determined M beams to the network-side device, to indicate the M beams selected by the terminal device to the network-side device. The network-side device may determine, based on the received indexes of the beams, the beams selected by the terminal device. The terminal device may explicitly or implicitly indicate the indexes of the M beams.

Optionally, in some embodiments, the terminal device may explicitly indicate the indexes of the M beams. Specifically, the terminal device may send a first beam tracking message to the network-side device. The beam tracking message includes the indexes of the M beams. The first beam tracking message is a Media Access Control (MAC) layer message. In this way, the terminal device may directly indicate the selected M beams to the network-side device using the MAC layer message.

Figure 2:
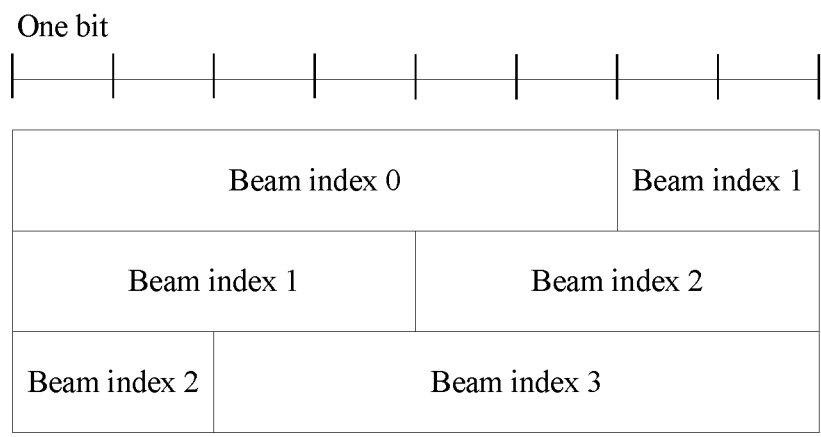
FIG. 2 is a schematic diagram of feeding back M beams using a load part of a MAC CE.

Specifically, for the first beam tracking message, the indexes of the M beams may be fed back to the network-side device using a load part of a MAC control element (CE). FIG. 2 is a schematic diagram of feeding back the M beams using the load part of the MAC CE. As shown in FIG. 2, M is 4. A quantity of bits (bit) occupied by a single beam index may be 6. If the terminal device determines that the M meeting a condition is less than 4, another position is filled with an invalid value. It may be understood that if a quantity of to-be-reported beams exceeds a quantity of beams that can be carried by one MAC CE, the terminal device may send the indexes of the M beams to the network-side device using a plurality of MAC CEs.

Further, an order of the indexes, which are in the first beam tracking message, of the beams may be determined based on the first beam reference quality value of each beam. For example, in the load part of the MAC CE, a first beam index in the indexes of the M beams is an index of a beam having a largest first beam reference quality value, a second beam index is an index of a beam having a second largest first beam reference quality value, and so on. In this way, the network-side device may determine an order of the first beam reference quality values of the beams based on the order of the indexes, which are in the beam tracking message, of the beams, so that the beam having the largest first beam reference quality value may be determined.

Optionally, in some embodiments, the terminal device may further send measurement results of the M beams to the network-side device. For example, the terminal device may send the first beam reference quality value of each of the M beams to the network-side device using the first beam tracking message. For another example, the terminal device may alternatively use another message to carry the first beam reference quality value of each of the M beams.

Optionally, in some other embodiments, the terminal device may implicitly indicate the indexes of the M beams. For example, if the value of M is 1, the terminal device may send a random access preamble to the network-side device on a time-frequency resource and/or a code resource corresponding to one beam, so as to indicate the one beam to the network-side device. A specific process may be similar to step 104. The one beam may be a beam that is detected by the terminal device, that is of the cell to be camped on by the terminal device, and that has a largest first beam reference quality value. In this way, the terminal device may implicitly indicate the one beam to the network-side device using the time-frequency resource and/or the code resource of the random access preamble, without using extra signaling. In this way, signaling overheads can be reduced.

In the foregoing technical solution, the terminal device may track a beam that can be detected, and report, to the network-side device, the tracked beam of the cell to be camped on, so that the network-side device can select, from the reported beam, a proper beam as a beam used to communicate with the terminal device. The network-side device may select one or more beams from the M beams indicated by the terminal device. The network-side device may send a downlink message to the terminal device using the selected one or more beams.

In some embodiments, the method may further include step 104.

104. The terminal device sends a random access preamble to the network-side device on a time-frequency resource and/or a code resource corresponding to an index of a first target beam, where the first target beam is a beam of the M beams that has a largest first beam reference quality value. The network-side device may determine, based on the time-frequency resource and/or the code resource of the received random access preamble, the beam that is detected by the terminal device, that belongs to the cell to be camped on by the terminal device, and that has the largest first beam reference quality value. In this way, the terminal device may directly indicate the beam having the largest first beam reference quality value to the network-side device. Alternatively, the network-side device may directly determine the beam having the largest first beam reference quality value. In addition, no extra signaling is used in an indication process, so that channel resources can be saved.

Optionally, in some embodiments, a time-frequency resource of each random access preamble corresponds to an index of one beam. The terminal device may determine the corresponding time-frequency resource based on the index of the first target beam, and send the random access preamble to the network-side device on the time-frequency resource. In this way, after receiving the random access preamble, the network-side device may directly determine, based on the time-frequency resource of the received random access preamble, an index of the beam, which has the largest first beam reference quality value, of the cell to be camped on by the terminal device.

Optionally, in some embodiments, a time-frequency resource of each random access preamble corresponds to indexes of one group of beams. Different code resources correspond to different beams on one time-frequency resource. For example, if a total quantity of available preambles is 64, each beam may correspond to eight preambles. For example, for a frequency $f_1$ and a subframe 1, a preamble 1 to a preamble 8 correspond to an index of a beam 1; for the frequency $f_1$ and the subframe 1, a preamble 9 to a preamble 16 correspond to an index of a beam 2; and so on. In this way, the terminal device may determine the corresponding time-frequency resource and code resource based on the index of the first target beam, and send the random access preamble to the network-side device on the time-frequency resource and the code resource. After receiving the random access preamble, the network-side device may directly determine, based on the time-frequency resource and the code resource of the received random access preamble, an index of the beam, which has the largest first beam reference quality value, of the cell to be camped on by the terminal device.

Optionally, in some embodiments, a correspondence between the index of the beam, the time-frequency resource, and the code resource may be preset. For example, it may be specified that K available preambles are grouped into L groups on each random access time-frequency resource, a quantity of preambles in each group is K/L, and indexes of beams to the preambles are o to L−1. Optionally, in some other embodiments, the group quantity L may be indicated by the network-side device to the terminal device. For example, the network-side device may indicate the group quantity L to the terminal device in a system message or a radio resource control (RRC) layer message. In this way, adaptability to different quantities of beams and different quantities of preambles can be ensured. Optionally, in some other embodiments, the network-side device may further indicate a correspondence between a time-frequency resource and a beam group. For example, three frequency resources are configured in one subframe, and each frequency resource corresponds to one beam group. A frequency resource 1 corresponds to a beam group 1, a frequency resource 2 corresponds to a beam group 2, a frequency resource 3 corresponds to a beam group 3, preambles in each beam group correspond to S/3 beams, and S is a total quantity of beams. A quantity of downlink beams in a cell and a correspondence between each beam and a random access preamble may be specified by a protocol, or indicated to the terminal device via a system broadcast message.

In some embodiments, the terminal device may first indicate the first target beam to the network-side device, and then indicate the M beams to the network-side device. In some other embodiments, the terminal device may first indicate the M beams to the network-side device, and then indicate the first target beam to the network-side device.

After obtaining the M beams reported by the terminal device, the network-side device may select, based on the M beams, the beam used to communicate with the terminal device. For example, the network-side device may select, from the M beams, one beam as a target beam, to communicate with the terminal device. Alternatively, the network-side device may select, from the M beams, a plurality of beams as target beams, to communicate with the terminal device. The network-side device may transmit information of all channels to the terminal device using the target beam. Alternatively, the terminal device may detect whether the network-side device sends information to the terminal device on the target beam. The target beam may be determined according to a preset rule. For example, the target beam may be one or more beams, which have largest first beam quality, of the M beams.

In addition to tracking, based on beam quality at a physical layer, the beam belonging to the cell to be camped on, the terminal device may further track a beam of the cell to be camped on by the terminal device and/or a beam of the neighboring cell of the terminal device based on beam quality at an RRC layer. For a specific tracking method, refer to step 105 to step 107, or step 108 to step no, or step 111 to step 113.

105. The terminal device determines N second beam reference quality values, where an $n^{th}$ second beam reference quality value of the N second beam reference quality values is determined based on an $n^{th}$ first beam reference quality value of the N first beam reference quality values, and n=1, . . . , or N.

Optionally, in some embodiments, for an $n^{th}$ beam of the N beams, the terminal device may directly determine the second beam reference quality value of the $n^{th}$ beam based on the first beam reference quality value of the $n^{th}$ beam.

Specifically, the terminal device may determine the second beam reference quality value using the following formula:

$$Q_t = (1-a) \cdot Q_{t-1} + a \cdot q_t \quad \text{(Formula 1.2)}$$

where $Q_t$ is a filtered second beam reference quality value obtained by the terminal device, $q_t$ is a current first beam reference quality value, $Q_{t-1}$ is a historical second beam reference quality value of the beam, and a is a filtering coefficient. The filtering coefficient may be preset, or may be indicated by the network-side device to the terminal device. This is not limited in this embodiment of this application. It may be understood that a value of a may be any value between 0 and 1 (including 0 and 1), and a smaller value of a indicates a lower weight of the current beam quality. For example, in some embodiments, a=0.1.

Optionally, in some embodiments, a preset threshold may be set. If a first beam reference quality value of a beam is greater than the preset threshold, a second beam reference quality value of the beam may be determined based on the first beam reference quality value of the beam; or if a first beam reference quality value of a beam is less than the preset threshold, filtering performed for the beam to determine a second beam reference quality value of the beam may be stopped. Optionally, a detection period may be set. A first beam reference quality value out of the detection period does not affect a filtering process in the detection period. If all first beam reference quality values of a beam in the detection period are greater than the preset threshold, but a first beam reference quality value of the beam out of the detection period is less than the preset threshold, a second beam reference quality value corresponding to the beam in the detection period may still be determined. If a first beam reference quality value of a beam in the detection period is less than the preset threshold, filtering performed on the first beam reference quality value of the beam is stopped. In this case, the terminal device may restart the detection period when the first beam reference quality value of the beam is greater than the preset threshold.

The terminal device determines a second beam tracking message based on the N second beam reference quality values.

Optionally, in some embodiments, that the terminal device determines a second beam tracking message based on the N second beam reference quality values includes: determining, by the terminal device, the second beam tracking message based on the N second beam reference quality values, the cell to which each of the N beams belongs, a first preset threshold, and a second preset threshold, where the first preset threshold is greater than the second preset threshold, the second beam tracking message includes an index of a candidate beam and/or an index of an available beam, a second beam reference quality value of the candidate beam is greater than or equal to the first preset threshold, and a second beam reference quality value of the available beam is less than the first preset threshold and is greater than or equal to the second preset threshold. Further, in some embodiments, the second beam tracking message may further include the second beam reference quality value of the candidate beam and/or the second beam reference quality value of the available beam. In the foregoing technical solution, the terminal device directly reports the candidate beam and/or the available beam to the network-side device, so that the network-side device may select a proper beam from the received candidate beam and/or available beam to communicate with the terminal device.

The terminal device may determine, based on pilot information corresponding to a beam, a cell to which the beam belongs. The pilot information is a reference signal, and the reference signal is generated based on a cell identifier. The second beam tracking message may include an index of a beam of at least one of cells to which the N beams belong. In some embodiments, the at least one cell may include the cell to be camped on by the terminal device.

The candidate beam and the available beam may be a candidate beam and an available beam of each of all the cells to which the N beams belong, or may be a candidate beam and an available beam of one or more of all the cells to which the N beams belong. For example, it is assumed that the N beams respectively belong to a cell 1 (it is assumed that the cell 1 is the cell to be camped on by the terminal device), a cell 2, and a cell 3. The terminal device may determine a candidate beam and an available beam only of the cell 1. Alternatively, the terminal device may determine candidate beams and available beams of any two or all of the cell 1, the cell 2, and the cell 3.

It may be understood that, in some cases, the one or more cells may include only one of the candidate beam and the available beam. In some other cases, the one or more cells may include the candidate beam and the available beam.

The network-side device may select the proper beam based on the candidate beam and the available beam to communicate with the terminal device.

Optionally, in some embodiments, that the terminal device determines a second beam tracking message based on the N second beam reference quality values includes: determining, by the terminal device, the second beam tracking message based on the N second beam reference quality values, the cell to which each of the N beams belongs, and a third preset threshold, where the second beam tracking message includes an index of a beam, whose second beam reference quality value is greater than or equal to the third preset threshold, of the N beams. Further, in some embodiments, the second beam tracking message may further include the second beam reference quality value of a beam of the N beams that is greater than or equal to the third preset threshold. In the foregoing technical solution, the terminal device may directly report an index of a beam meeting a preset condition (to be specific, being greater than or equal to the third preset threshold) to the network-side device, so that the network-side device may directly select a proper beam from the beam meeting the preset condition, to communicate with the terminal device. Optionally, in some embodiments, the second beam tracking message includes indexes of P beams, a second beam reference quality value of each of the P beams is greater than or equal to the third preset threshold, and P is a positive integer greater than or equal to 1 and less than or equal to M. In other words, if the terminal device determines that a quantity of beams meeting the preset condition is greater than or equal to M, the terminal device reports the indexes of the M beams; or if the terminal device determines that a quantity of beams meeting the preset condition is not greater than M, the terminal device reports indexes of all beams meeting the preset condition.

In some embodiments, the third preset threshold may be equal to the first preset threshold. In some embodiments, the third preset threshold may be equal to the second preset threshold. In some embodiments, the third preset threshold may alternatively be not equal to the first preset threshold or the second preset threshold. For example, the third preset threshold may be greater than the second preset threshold and less than the first preset threshold.

Similarly, the index, which is included in the second beam tracking message, of the beam may be an index of a beam, whose second beam reference quality value is greater than the third preset threshold, of at least one of all the cells to which the N beams belong. Alternatively, the index, which is included in the second beam tracking message, of the beam may be an index of a beam, whose second beam reference quality value is greater than the third preset threshold, of all the cells to which the N beams belong.

Optionally, in some embodiments, that the terminal device determines a second beam tracking message based on the N second beam reference quality values includes: determining, by the terminal device based on the N second beam reference quality values and the cell to which each of the N beams belongs, at least two reference beams of each of at least one of cells to which the N beams belong, where the at least two reference beams of each cell are two beams of each cell that have largest second beam reference quality values. The terminal device determines the second beam tracking message, and the second beam tracking message includes indexes of the determined at least two reference beams of each cell. Further, in some embodiments, the second beam tracking message may further include the second beam reference quality values of the at least two reference beams of each cell. Optionally, in some embodiments, a quantity of reference beams that needs to be determined may be specified by a protocol, or may be configured by a base station for the terminal device. In the foregoing technical solution, the terminal device may directly report a plurality of beams having largest second beam reference quality values to the network-side device, so that the network-side device may select, from the plurality of beams having largest second beam quality values, a beam that may be used to communicate with the terminal device.

Similarly, the index, which is included in the second beam tracking message, of the beam may be the indexes of the at least two reference beams of at least one of all the cells to which the N beams belong. Alternatively, the index, which is included in the second beam tracking message, of the beam may be indexes of at least two reference beams of each of all the cells to which the N beams belong.

In the foregoing embodiment, in addition to the index of the beam, the second beam tracking message may further include the second beam reference quality value of the beam. It may be understood that if the second beam tracking message includes indexes of beams respectively belonging to a plurality of cells, the second beam tracking message may further include information used to indicate the cells to which the beams belong.

Further, if the second beam tracking message includes indexes of a plurality of beams of one cell, an order of the indexes of the plurality of beams may be determined based on second beam reference quality values of the beams. For example, a beam corresponding to a first beam index has a largest second beam reference quality value, a beam corresponding to a second beam index has a second largest second beam reference quality value, and so on. In this way, the network-side device may determine the order of the second beam reference quality values of each cell based on the order of the received indexes of the beams.

Optionally, in some other embodiments, the terminal device may determine a cell measurement result based on the N second beam reference quality values, and determine that the second beam tracking message includes the cell measurement result. The network-side device may perform cell-level tracking on a beam using the reported cell measurement result.

Optionally, in some embodiments, the cell measurement result may be a largest second beam reference quality value of each cell in at least one group in the cells to which the N beams belong.

For example, it is assumed that the N beams respectively belong to a cell 1 (it is assumed that the cell 1 is the cell to be camped on by the terminal device), a cell 2, and a cell 3. The terminal device may determine that a largest second beam reference quality value of the cell 1 is used as a cell measurement result of the cell 1. The terminal device may further determine that a largest second beam reference quality value of the cell 2 is used as a cell measurement result of the cell 2. The terminal device may further determine that a largest second beam reference quality value of the cell 3 is used as a cell measurement result of the cell 3. The cell measurement result may include the cell measurement results of the cell 1, the cell 2, and the cell 3.

Optionally, in some other embodiments, the cell measurement result may be an average value of the second beam reference quality values of the at least two reference beams of each of at least one of the cells to which the N beams belong, and the at least two reference beams of each cell are at least two beams of each cell that have largest second beam reference quality values. A quantity of reference beams that needs to be determined may be specified by a protocol, or may be configured by the network-side device for the terminal device.

For example, it is assumed that the N beams respectively belong to a cell 1 (it is assumed that the cell 1 is the cell to be camped on by the terminal device), a cell 2, and a cell 3. The terminal device may determine that an average value of three largest second beam reference quality values of the cell 1 is used as a cell measurement result of the cell 1. The terminal device may further determine that an average value of three largest second beam reference quality values of the cell 2 is used as a cell measurement result of the cell 2. The terminal device may further determine that an average value of three largest second beam reference quality values of the cell 3 is used as a cell measurement result of the cell 3. The cell measurement result may include the cell measurement results of the cell 1, the cell 2, and the cell 3. The average value may be an arithmetic average value, or may be a geometrical average value or the like. This is not limited in this embodiment of this application.

Optionally, in some embodiments, the second beam tracking message may further include the N second beam reference quality values and indexes of the N beams. In this way, the network-side device may determine a specific result based on the N second beam reference quality values. For example, the network-side device may determine a candidate beam and/or an available beam based on the first preset threshold and the second preset threshold. It may be understood that the network-side device may alternatively determine a candidate beam and/or an available beam of at least one of the cells to which the N beams belong. For another example, the network-side device may determine, based on the third preset threshold, a beam whose second beam reference quality value is greater than the third preset threshold. For still another example, the network-side device may determine a plurality of beams of each cell that have largest second beam reference quality. For still another example, the network-side device may determine the cell measurement result. A specific process of determining the foregoing specific result by the network-side device is similar to a specific process of determining the same specific result by the terminal device. Details are not reproduced herein.

107. The terminal device sends the second beam tracking message to the network-side device, where the second beam tracking message is an RRC layer message.

In the foregoing technical solution, the terminal device may determine a second beam reference quality value of each beam based on a plurality of first beam reference quality values of each beam. In this way, a reference quality value of the beam tracked by the terminal device is a measurement result obtained after accumulation in a period of time. In addition, the second beam tracking message may include an index of a beam of at least one of the cells to which the N beams belong. In this way, the network-side device may obtain a beam quality value of the cell to be camped on by the terminal device and a beam quality value of a neighboring cell of the terminal device. In this case, the network-side device can not only determine a cell status of the cell to be camped on by the terminal device, but also determine a cell status of the neighboring cell that can be detected by the terminal device.

Optionally, in some embodiments, the terminal device may periodically send the second beam tracking message to the network-side device. A sending period may be preset, or may be indicated by the network-side device to the terminal device.

Optionally, in some embodiments, the terminal device may alternatively send the second beam tracking message to the network-side device when a preset measurement event is met. Specifically, the terminal device may determine, using the beam-based cell measurement result, whether the preset measurement event is met. When the preset measurement event is met, the terminal device may send the second beam tracking message to the network-side device. The terminal device may further simultaneously report the preset measurement event. The preset measurement event may include one or more of the following: a cell measurement result of the cell to be camped on by the terminal device is less than a cell measurement result of the neighboring cell of the terminal device by a preset offset; a cell measurement result of the cell to be camped on by the terminal device is less than a preset threshold; a cell measurement result of the neighboring cell of the terminal device is greater than a preset threshold; or the like. The preset measurement event and the preset offset and the preset threshold that are used in the preset measurement event may be preset by the terminal device, or may be indicated by the network-side device to the terminal device. In the foregoing technical solution, the terminal device may determine, based on a beam tracking result, whether the preset measurement event is met, so as to select to-be-reported content based on a determining result.

In addition to sending the cell measurement result to the network-side device according to step 105 to step 107, the terminal device may further determine the cell measurement result and send the cell measurement result to the network-side device according to step 108 to step no.

108. The terminal device determines, based on the N first beam reference quality values and the cell to which each of the N beams belongs, a largest first beam reference quality value of each of at least one of cells to which the N beams belong.

109. The terminal device determines a second beam reference quality value of each cell based on the largest first beam reference quality value of the each cell. Alternatively, the second beam reference quality value may be determined using the formula 1.2. Details are not reproduced herein.

The terminal device sends the second beam reference quality value of each cell to the network-side device via an RRC layer message. The second beam reference quality value of each cell is a cell measurement result of each cell.

In the foregoing technical solution, the terminal device may determine the cell measurement result based on a beam tracking result, and report the cell measurement result obtained through measurement to the network-side device, so that the network-side device obtains, in a timely manner, the cell measurement result obtained by the terminal device through tracking.

Optionally, in some embodiments, the terminal device may send a second beam tracking message to the network-side device when a preset measurement event is met. Specifically, the terminal device may determine, according to the beam-based cell measurement result, whether the preset measurement event is met. When the preset measurement event is met, the terminal device may send the second beam tracking message to the network-side device. The terminal device may further simultaneously report the preset measurement event. Specific content of the preset measurement event is the same as that in step 107. Details are not reproduced herein.

Optionally, in some embodiments, the terminal device may periodically send the second beam reference quality value of each cell to the network-side device. A sending period may be preset, or may be indicated by the network-side device to the terminal device.

In some other embodiments, the terminal device may alternatively determine the cell measurement result and send the cell measurement result to the network-side device according to step 111 to step 113.

111. The terminal device determines, based on the N first beam reference quality values and the cell to which each of the N beams belongs, an average value of at least two beams, which have largest first beam reference quality values, of each of at least one of cells to which the N beams belong.

112. The terminal device determines a second beam reference quality value of each cell based on the average value of the at least two beams of each cell that have the largest first beam reference quality values.

113. The terminal device sends the second beam reference quality value of each cell to the network-side device via an RRC layer message. The second beam reference quality value of each cell is a cell measurement result of each cell.

In the foregoing technical solution, the terminal device may determine the cell measurement result based on a beam tracking result, and report the cell measurement result obtained through measurement to the network-side device, so that the network-side device obtains, in a timely manner, the cell measurement result obtained by the terminal device through tracking.

Optionally, in some embodiments, the terminal device may send a second beam tracking message to the network-side device when a preset measurement event is met. Specifically, the terminal device may determine, according to the beam-based cell measurement result, whether the preset measurement event is met. When the preset measurement event is met, the terminal device may send the second beam tracking message to the network-side device. The terminal device may further simultaneously report the preset measurement event. Specific content of the preset measurement event is the same as that in step 107. Details are not reproduced herein.

Optionally, in some embodiments, the terminal device may periodically send the second beam reference quality value of each cell to the network-side device. A sending period may be preset, or may be indicated by the network-side device to the terminal device.

It may be understood that the step numbers (to be specific, 101 to 113) in the foregoing embodiment are merely intended for helping better describe the embodiment, rather than limiting an order of the steps. For example, step 104 may be performed after step 103, or before step 103. Step 105 to step 107, step 108 to step no, and step 111 to step 113 may be performed after step 104, or after step 103. In addition, for brevity of description, FIG. 1 shows only step 101 to step 103.

Figure 3:
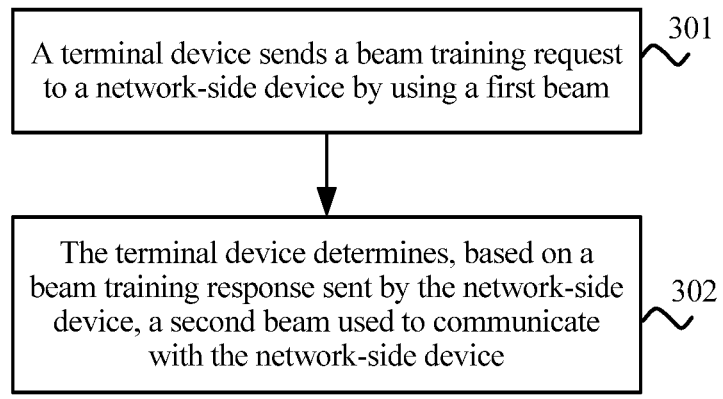
FIG. 3 is a schematic flowchart of another beam tracking method according to an embodiment of this application.

FIG. 3 is a schematic flowchart of another beam tracking method according to an embodiment of this application.

301. A terminal device sends a beam training request to a network-side device using a first beam.

Optionally, in some embodiments, the terminal device may determine the first beam in the following manner: sending, by the terminal device, a random access preamble to the network-side device on N time-frequency resources by respectively using N beams, where subframe numbers and/or frequency resource numbers of any two of the N time-frequency resources are different, and N is a positive integer greater than or equal to 2; receiving, by the terminal device, at least one random access response message sent by the network-side device; and determining, by the terminal device, the first beam from the N beams based on a value of an RA-RNTI in each of the at least one random access response message. In this way, the terminal device may select, from a plurality of available beams, a beam that may be used to communicate with the network-side device, so as to send a request message to the network-side device using the beam.

Specifically, after receiving the random access preamble sent by the terminal device, the network-side device may determine the value of the random access-radio network temporary identifier (RA-RNTI) based on a time-frequency resource of the random access preamble. The value of the RA-RNTI meets the following formula:

$$RA\text{-}RNTI = 1 + t\_id + 10 * f\_id \qquad \text{(Formula 1.3)}$$

where RA-RNTI is the value of the RA-RNTI, t_id is a subframe number, and f_id is a frequency resource number.

The random access response message sent by the network-side device is scrambled based on the determined value of the RA-RNTI. In this way, the terminal device may determine, by descrambling the random access response message, that one or more available beams of the N beams may be used to send uplink information.

Optionally, in some embodiments, the terminal device receives only one random access response message sent by the network-side device. In this case, the terminal device descrambles the random access response message based on the value of the RA-RNTI, and determines a time-frequency resource used when a preamble is sent. The terminal device may determine that a beam corresponding to the time-frequency resource is the first beam, because a time-frequency resource is in a one-to-one correspondence with a beam.

Optionally, in some other embodiments, the terminal device may receive a plurality of random access response messages sent by the network-side device. In this case, the terminal device may descramble a value of an RA-RNTI in a first received random access response message, determine one time-frequency resource, and determine that a beam corresponding to the time-frequency resource is the first beam. Alternatively, the terminal device may descramble a value of an RA-RNTI in any received random access response message, determine one time-frequency resource, and determine that a beam corresponding to the time-frequency resource is the first beam.

Optionally, in some embodiments, the first beam may be any beam that may be used by the terminal device.

302. The terminal device determines, based on a beam training response sent by the network-side device, a second beam used to communicate with the network-side device, where the beam training response includes M physical pilot resources, and M is a positive integer greater than or equal to 1.

In the foregoing technical solution, the terminal device may select a proper beam from a plurality of available beams, to communicate with the network-side device.

Optionally, in some embodiments, the terminal device may send a reference signal to the network-side device on the M physical pilot resources by respectively using M beams. The terminal device receives feedback information sent by the network-side device, and the feedback information includes indexes of one or more of the M beams. The terminal device determines the second beam based on the feedback information, and the second beam belongs to the one or more beams. In the foregoing technical solution, the terminal device may train an available beam and determine, based on the information fed back by the network-side device, the beam that may be used to communicate with the network-side device.

After receiving the reference signal, the network-side device may determine a beam quality value of each of the M beams based on the received reference signal. The network-side device determines the feedback information based on the determined beam quality value of each beam, and the feedback information may include indexes of one or more beams, which have largest beam quality values, of the M beams. Alternatively, the feedback information may include indexes of one or more beams whose beam quality values are greater than a preset threshold.

Optionally, in some embodiments, the terminal device may determine a first physical pilot resource based on the M physical pilot resources, and send a reference signal to the network-side device on the first physical pilot resource using at least one beam, and the first physical pilot resource is a physical pilot resource corresponding to a physical pilot resource used when the terminal device receives information sent by the network-side device. The terminal device receives the feedback information sent by the network-side device, and the feedback information includes indexes of one or more of the at least one beam. The terminal device determines the second beam based on the feedback information, and the second beam belongs to the one or more beams. The feedback information may be sent to the terminal device on a dedicated physical layer resource, or may be sent to the terminal device via a MAC layer message or an RRC layer message. This is not limited in this embodiment of this application. The beam quality value may be an RSRP, RSRQ, or the like, or may be a beam quality value obtained through filtering using the formula 1.1. This is not limited in this embodiment of this application.

Optionally, in some embodiments, a quantity of available sending beams of the terminal device may be less than the quantity M of physical pilot resources. In this case, before the terminal device sends the reference signal to the network-side device on the M physical pilot resources by respectively using the M beams, the terminal device may further select the M beams from a plurality of available beams. The terminal device may randomly select the M beams, or may select the M beams determined based on the value of the RA-RNTI in the received random access response message. In the foregoing technical solution, the terminal device may select a proper quantity of beams used for training, so that the quantity of beams used for training is equal to a quantity of physical pilot resources that are allocated by the network-side device to the terminal device and that is used to perform beam training.

The pilot resource configured by the network-side device may be periodically configured, or may be discretely configured. The pilot resource includes a demodulation reference signal (DMRS), a sounding reference signal (SRS), and the like. The pilot resource configured by the network-side device includes a first identifier, and the first identifier is used to indicate that the pilot resource is a pilot resource used to perform beam training.

Optionally, in some embodiments, before the terminal device determines, based on the beam training response sent by the network-side device, the second beam used to communicate with the network-side device, the terminal device may indicate the quantity of available sending beams of the terminal device to the network-side device. The quantity of available sending beams of the terminal device may be carried in the beam training request. The network-side device may determine the quantity M of physical pilot resources based on the quantity of available sending beams. The quantity M of physical pilot resources may be less than or equal to the quantity of available sending beams. In the foregoing technical solution, the terminal device may send the quantity of available beams to the network-side device, so that the network-side device determines, based on the quantity of available beams, a quantity of physical pilot resources to be allocated to the terminal device.

An embodiment of this application further provides a terminal device. The terminal device includes a processing unit and a sending unit.

The processing unit is configured to determine N first beam reference quality values, where the N first beam reference quality values respectively correspond to N beams, and N is a positive integer greater than or equal to 1.

The processing unit is further configured to select M beams from the N beams based on the N first beam reference quality values and a cell to which each of the N beams belongs, where M is a positive integer greater than or equal to 1 and less than or equal to N, and the M beams belong to a cell to be camped on by the terminal device.

The sending unit is configured to indicate the selected M beams to a network-side device providing a service for the terminal device.

Optionally, in some implementations, the sending unit is specifically configured to send a first beam tracking message to the network-side device. The first beam tracking message includes indexes of the M beams. The first beam tracking message is a Media Access Control MAC layer message.

Optionally, in some implementations, the sending unit is further configured to send a random access preamble to the network-side device on a time-frequency resource and/or a code resource corresponding to an index of a first target beam. The first target beam is a beam of the M beams that has a largest first beam reference quality value.

Optionally, in some implementations, the processing unit is further configured to determine N second beam reference quality values. An $n^{th}$ second beam reference quality value of the N second beam reference quality values is determined based on an $n^{th}$ first beam reference quality value of the N first beam reference quality values, and n=1, . . . , or N. The processing unit is further configured to determine a second beam tracking message based on the N second beam reference quality values. The sending unit is further configured to send the second beam tracking message to the network-side device. The second beam tracking message is a radio resource control (RRC) layer message.

Optionally, in some implementations, the processing unit is specifically configured to determine the second beam tracking message based on the N second beam reference quality values, the cell to which each of the N beams belongs, a first preset threshold, and a second preset threshold. The first preset threshold is greater than the second preset threshold. The second beam tracking message includes an index of a candidate beam and/or an index of an available beam. A second beam reference quality value of the candidate beam is greater than or equal to the first preset threshold. A second beam reference quality value of the available beam is less than the first preset threshold and is greater than or equal to the second preset threshold.

Optionally, in some implementations, the processing unit is specifically configured to determine the second beam tracking message based on the N second beam reference quality values, the cell to which each of the N beams belongs, and a third preset threshold. The second beam tracking message includes an index of a beam of the N beams that has a second beam reference quality value greater than or equal to the third preset threshold.

Optionally, in some implementations, the processing unit is specifically configured to: determine, based on the N second beam reference quality values and the cell to which each of the N beams belongs, at least two reference beams of each of at least one of cells to which the N beams belong, where the at least two reference beams of each cell are at least two beams of each cell that have largest second beam reference quality values; and determine the second beam tracking message, where the second beam tracking message includes indexes of the determined at least two reference beams of each cell.

Optionally, in some implementations, the processing unit is specifically configured to: determine a cell measurement result based on the N second beam reference quality values and the cell to which each of the N beams belongs, and determine the second beam tracking message. The cell measurement result is a largest second beam reference quality value of each of at least one of cells to which the N beams belong, and the second beam tracking message includes the cell measurement result.

Optionally, in some implementations, the processing unit is specifically configured to: determine, based on the N second beam reference quality values and the cell to which each of the N beams belongs, at least two reference beams of each of at least one of cells to which the N beams belong, where the at least two reference beams of each cell are at least two beams of each cell that have largest second beam reference quality values; determine a cell measurement result, where the cell measurement result includes an average value of the second beam reference quality values of the at least two reference beams of each cell; and determine the second beam tracking message, where the second beam tracking message includes the cell measurement result.

Optionally, in some implementations, the processing unit is further configured to determine, based on the N first beam reference quality values and the cell to which each of the N beams belongs, a largest first beam reference quality value of each of at least one of cells to which the N beams belong. The processing unit is further configured to determine a second beam reference quality value of each cell based on the largest first beam reference quality value of each cell. The sending unit is further configured to: use the second beam reference quality value of each cell as a cell measurement result, and send the second beam reference quality value to the network-side device via an RRC layer message.

Optionally, in some implementations, the processing unit is further configured to determine, based on the N first beam reference quality values and the cell to which each of the N beams belongs, an average value of at least two largest first beam reference quality values of each of at least one of cells to which the N beams belong. The processing unit is further configured to determine second beam reference quality of each cell based on the average value of the at least two largest first beam reference quality values of each cell. The sending unit is further configured to: use the second beam reference quality of each cell as a cell measurement result, and send the second beam reference quality to the network-side device via an RRC layer message.

Optionally, in some implementations, the processing unit is further configured to determine, based on the cell measurement result, whether a preset measurement event is met.

Optionally, in some implementations, the terminal device further includes a receiving unit, configured to receive a value of M indicated by the network-side device.

Optionally, in some embodiments, the processing unit may be implemented by a processor, the sending unit may be implemented by a transmitter or a transceiver, and the receiving unit may be implemented by a receiver or the transceiver.

An embodiment of this application further provides a structural block diagram of a network-side device. The network-side device includes a receiving unit, a processing unit, and a sending unit.

The receiving unit is configured to obtain M beams indicated by a terminal device, where the M beams belong to a cell to be camped on by the terminal device, and M is a positive integer greater than or equal to 1.

The processing unit is configured to select a beam from the M beams.

The sending unit is configured to send a downlink message to the terminal device using the selected beam.

Optionally, in some implementations, the receiving unit is specifically configured to receive a first beam tracking message sent by the terminal device. The first beam tracking message includes indexes of the M beams. The first beam tracking message is a MAC layer message.

Optionally, in some implementations, the receiving unit is further configured to receive a random access preamble sent by the terminal device. The processing unit is further configured to determine a first target beam based on a time-frequency resource and/or a code resource of the random access preamble, where the first target beam is a beam of the M beams that has a largest first beam reference quality value.

Optionally, in some implementations, the receiving unit is further configured to receive a second beam tracking message sent by the terminal device. The second beam tracking message is an RRC layer message. The second beam tracking message includes an index of a candidate beam and/or an index of an available beam. A second beam reference quality value of the candidate beam is greater than or equal to a first preset threshold. A second beam reference quality value of the available beam is less than the first preset threshold and is greater than or equal to a second preset threshold. The first preset threshold is greater than the second preset threshold.

Optionally, in some implementations, the receiving unit is further configured to receive a second beam tracking message sent by the terminal device. The second beam tracking message is an RRC layer message. The second beam tracking message includes an index of at least one beam. A second beam reference quality value of the at least one beam is greater than or equal to a third preset threshold.

Optionally, in some implementations, the receiving unit is further configured to receive a second beam tracking message sent by the terminal device. The second beam tracking message is an RRC layer message. The second beam tracking message includes indexes of at least two reference beams belonging to each of at least one cell. The at least two reference beams of each cell are at least two beams of each cell that have largest second beam reference quality values.

Optionally, in some implementations, the receiving unit is further configured to receive a second beam tracking message sent by the terminal device. The second beam tracking message is an RRC layer message. The second beam tracking message includes a cell measurement result. The cell measurement result is a largest second beam reference quality value of each of at least one cell.

Optionally, in some implementations, the receiving unit is further configured to receive a second beam tracking message sent by the terminal device. The second beam tracking message is an RRC layer message. The second beam tracking message includes a cell measurement result. The cell measurement result includes an average value of second beam reference quality values of at least two reference beams of each of at least one cell. The at least two reference beams of each cell are at least two beams of each cell that have largest second beam reference quality values.

Optionally, in some implementations, the receiving unit is further configured to receive a cell measurement result of each of at least one cell sent by the terminal device. The cell measurement result of each cell includes a second beam reference quality value of each cell.

Optionally, in some implementations, the receiving unit is further configured to receive a second beam tracking message sent by the terminal device. The second beam tracking message is an RRC layer message. The second beam tracking message includes a cell measurement result. The cell measurement result includes second beam reference quality of each of at least one cell. The second beam reference quality of each cell is determined based on an average value of at least two first beam reference quality values of each cell.

Optionally, in some implementations, the sending unit is further configured to send a value of M to the terminal device.

Optionally, in some embodiments, the processing unit may be implemented by a processor, the sending unit may be implemented by a transmitter or a transceiver, and the receiving unit may be implemented by a receiver or the transceiver.

An embodiment of this application further provides a terminal device. The terminal device includes a sending unit, a receiving unit, and a processing unit.

The sending unit is configured to send a beam training request to a network-side device using a first beam.

The receiving unit is configured to receive a beam training response sent by the network-side device.

The processing unit is configured to determine, based on the beam training response, a second beam used to communicate with the network-side device, where the beam training response includes M physical pilot resources, and M is a positive integer greater than or equal to 1.

Optionally, in some implementations, the sending unit is further configured to send a random access preamble to the network-side device on N time-frequency resources by respectively using N beams, where subframe numbers and/or frequency resource numbers of any two of the N time-frequency resources are different, and N is a positive integer greater than or equal to 2. The receiving unit is further configured to receive at least one random access response message sent by the network-side device. The processing unit is further configured to determine the first beam from the N beams based on a value of an RA-RNTI in each of the at least one random access response message.

Optionally, in some implementations, the sending unit is further configured to send a reference signal to the network-side device on the M physical pilot resources by respectively using M beams. The receiving unit is further configured to receive feedback information sent by the network-side device, where the feedback information includes indexes of one or more of the M beams. The processing unit is specifically configured to determine the second beam based on the feedback information, where the second beam belongs to the one or more beams.

Optionally, in some implementations, the processing unit is further configured to select M beams from a plurality of available beams.

Optionally, in some implementations, the sending unit is further configured to indicate a quantity of available sending beams of the terminal device to the network-side device.

Optionally, in some embodiments, the processing unit may be implemented by a processor, the sending unit may be implemented by a transmitter or a transceiver, and the receiving unit may be implemented by a receiver or the transceiver.

An embodiment of this application further provides a network-side device. The network-side device includes a receiving unit, a processing unit, and a sending unit.

The receiving unit is configured to receive a beam training request sent by a terminal device.

The processing unit is configured to determine a beam training response, where the beam training response includes M physical pilot resources, and M is a positive integer greater than or equal to 1.

The sending unit is configured to send the beam training response to the terminal device.

Optionally, in some implementations, the receiving unit is further configured to receive N random access preambles sent by the terminal device, where N is a positive integer greater than or equal to 1. The processing unit is further configured to determine values of N RA-RNTIs based on a time-frequency resource of each of the N random access preambles. The sending unit is further configured to send N random access responses to the terminal device, where the N random access responses are respectively scrambled based on the values of the N RA-RNTIs.

Optionally, in some implementations, the receiving unit is further configured to receive a reference signal that is sent by the terminal device on the M physical pilot resources by respectively using M beams. The processing unit is further configured to determine a beam quality value of each of the M beams based on the received reference signal. The processing unit is further configured to determine feedback information based on the beam quality value of each beam, where the feedback information includes indexes of one or more of the M beams.

Optionally, in some implementations, the processing unit is specifically configured to: determine, based on the beam quality value of each beam, that the feedback information includes indexes of one or more beams having largest beam quality values; or determine, based on the beam quality value of each beam, that the feedback information includes indexes of one or more beams whose beam quality values are greater than a preset threshold.

Optionally, in some implementations, the receiving unit is further configured to receive a quantity of available sending beams that is sent by the terminal device. The sending unit is further configured to determine the quantity M of physical pilot resources based on the quantity of available sending beams, where M is less than or equal to the quantity of available sending beams.

Optionally, in some embodiments, the processing unit may be implemented by a processor, the sending unit may be implemented by a transmitter or a transceiver, and the receiving unit may be implemented by a receiver or the transceiver.

Figure 4:
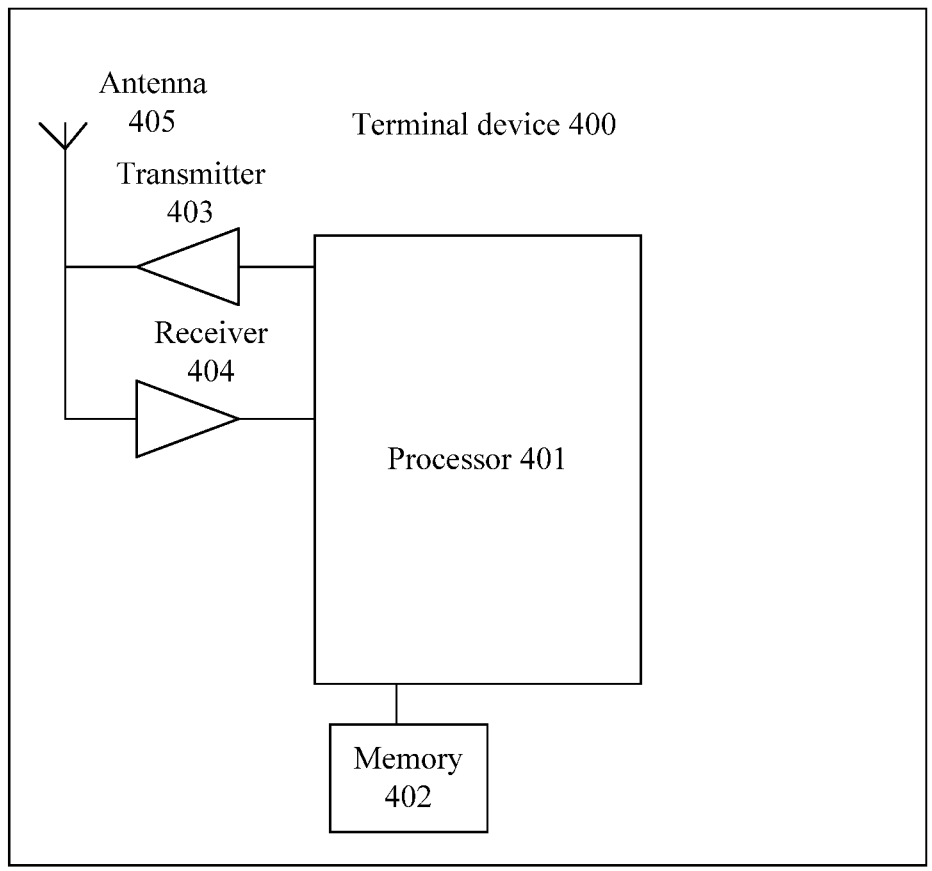
FIG. 4 is a structural block diagram of a terminal device according to an embodiment of this application.

FIG. 4 is a structural block diagram of a terminal device according to an embodiment of this application. As shown in FIG. 4, the terminal device 400 includes a processor 401, a memory 402, a transmitter 403, a receiver 404, and an antenna 405.

It may be understood that, although not shown, the terminal device 400 may further include another apparatus, such as an input apparatus, an output apparatus, or a battery.

The processor 401 may include a function of operating one or more software programs. The software program may be stored in the memory 402. The processor 401 and a software instruction stored in the memory 402 may be usually configured as an action executed by the terminal device 400. For example, the processor 401 can operate a connection program. The memory 402 may be a read-only memory, a flash memory, or a magnetic storage device, such as a hard disk, a floppy disk drive, or a magnetic tape. The memory 402 may store one or more software programs, instructions, information blocks, pieces of data, and the like.

Optionally, in some embodiments, the memory 402 may store an instruction used to perform the method performed by the terminal device in the method shown in FIG. 1. The processor 401 may execute the instruction stored in the memory 402, to perform, in combination with other hardware (such as the transmitter 403, the receiver 404, and the antenna 405), the steps performed by the terminal device in the method shown in FIG. 1. For a specific working process and advantageous effects, refer to the descriptions of the terminal device in the embodiment shown in FIG. 1.

Optionally, in some other embodiments, the memory 402 may store an instruction used to perform the method performed by the terminal device in the method shown in FIG. 3. The processor 401 may execute the instruction stored in the memory 402, to perform, in combination with other hardware (such as the transmitter 403, the receiver 404, and the antenna 405), the steps performed by the terminal device in the method shown in FIG. 3. For a specific working process and advantageous effects, refer to the descriptions of the terminal device in the embodiment shown in FIG. 3.

Figure 5:
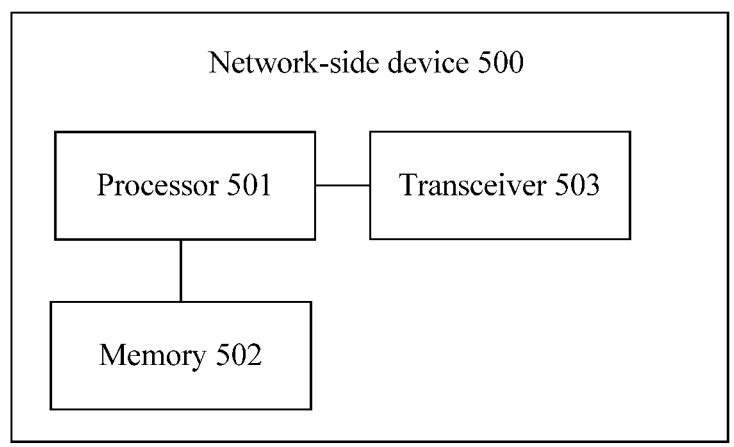
FIG. 5 is a structural block diagram of a network-side device according to an embodiment of this application.

FIG. 5 is a structural block diagram of a network-side device according to an embodiment of this application. The network-side device 500 shown in FIG. 5 includes a processor 501, a memory 502, and a transceiver 503.

The methods disclosed in the embodiments of this application may be applied to the processor 501, or is implemented by the processor 501. The processor 501 may be an integrated circuit chip having a signal processing capability. During implementation, the steps of the foregoing methods may be performed using an integrated logic circuit of hardware in the processor 501 or an instruction in a form of software. The processor 501 may be a general purpose processor, a digital signal processor (DSP), an application-specific integrated circuit (ASIC), a field programmable gate array (FPGA) or another programmable logic device, a discrete gate or a transistor logic device, or a discrete hardware component, and may implement or perform the methods, steps, and logical block diagrams disclosed in the embodiments of this application. The general purpose processor may be a microprocessor. Alternatively, the processor may be any conventional processor or the like. The steps of the methods disclosed in the embodiments of this application may be directly embodied as being performed and completed by a hardware decoding processor, or being performed and completed using a combination of hardware and a software module in a decoding processor. The software module may be located in a mature storage medium in the art, such as a random access memory (RAM), a flash memory, a read-only memory (ROM), a programmable read-only memory, an electrically-erasable programmable memory, or a register. The storage medium is located in the memory 502. The processor 501 reads an instruction in the memory 502 and performs the steps in the foregoing methods in combination with the hardware in the processor 501.

Optionally, in some embodiments, the memory 502 may store an instruction used to perform the method performed by the network-side device in the method shown in FIG. 1. The processor 501 may execute the instruction stored in the memory 502, to perform, in combination with other hardware (such as the transceiver 503 and an antenna 504), the steps performed by the network side in the method shown in FIG. 1. For a specific working process and advantageous effects, refer to the descriptions of the network-side device in the embodiment shown in FIG. 1.

Optionally, in some other embodiments, the memory 502 may store an instruction used to perform the method performed by the network-side device in the method shown in FIG. 3. The processor 501 may execute the instruction stored in the memory 502, to perform, in combination with other hardware (such as the transceiver 503), the steps performed by the network-side device in the method shown in FIG. 3. For a specific working process and advantageous effects, refer to the descriptions of the network-side device in the embodiment shown in FIG. 3.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the foregoing method embodiments. Details are not reproduced herein again.

In the several embodiments provided in this application, it should be understood that the disclosed systems, apparatuses, and methods may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:
1. A method by a terminal device, comprising:
  determining a first beam reference quality value for each beam of N beams, to obtain N first beam reference quality values, wherein N is a positive integer, and the N beams belong to one or more cells of one or more base stations in communication with the terminal device, and wherein the N first beam reference quality values are obtained by performing filtering at a layer higher than a physical layer based on a physical layer measurement result;

selecting P beams from the N beams based on the N first beam reference quality values, wherein P is a positive integer, and wherein each of the selected P beams belongs to a serving cell of the terminal device;

for each of the one or more cells, determining, using the determined N first beam reference quality values, an average value of at least two largest first beam reference quality values among first beam reference quality values of the respective cell;

for each of the one or more cells, after determining the average value of the at least two largest first beam reference quality values among the first beam reference quality values of the respective cell, determining a respective second beam reference quality value of the respective cell using the determined average value corresponding to the respective cell;

indicating the selected P beams to a network-side device that provides a service for the terminal device;

sending a cell measurement result of each of the one or more cells to the network-side device, wherein each respective cell measurement result comprises the respective second beam reference quality value corresponding to the respective cell of the one or more cells;

receiving an indication from the network-side device, wherein the indication indicates a random access preamble available to the terminal device, and a time-frequency resource of the random access preamble available to the terminal device corresponds to an index of a beam; and sending a selected random access preamble on a time-frequency resource corresponding to a first target beam to the network-side device, wherein the first target beam is a beam of the P beams that has a largest first beam reference quality value.

2. The method according to claim 1, wherein indicating the selected P beams, and sending the cell measurement result of each of the one or more cells, comprises:

sending a radio resource control (RRC) layer message to the network-side device, wherein the RRC layer message comprises indexes of the selected P beams, and wherein the first beam reference quality of each of the selected P beams is greater or equal to a preset threshold.

3. The method according to claim 2, wherein the RRC layer message further comprises the cell measurement result of each of the one or more cells.

4. The method according to claim 2, wherein the RRC layer message further comprises the first beam reference quality values of the selected P beams.

5. The method according to claim 2, further comprising:

determining, for each beam of the P beams, the respective first beam reference quality value corresponding to the respective beam of the selected P beams according to the following relation:

$$Q_t = (1-a) \cdot Q_{t-1} + a \cdot q_t$$

wherein:

"$Q_t$" is a respective first beam reference quality value corresponding to the respective beam, "$q_t$" is a respective physical beam reference quality value corresponding to the respective beam, "$Q_{t-1}$" is a respective historical first beam reference quality value corresponding to the respective beam, and "a" is a filtering coefficient.

6. The method according to claim 1, further comprising:

for each cell to which at least one beam of the N beams belongs, determining, based on the corresponding respective cell measurement result, whether a preset measurement event is met.

7. The method according to claim 1, further comprising:

receiving a value of M from the network-side device, wherein M is a positive integer greater than or equal to 1 and less than or equal to N, and wherein P is less than or equal to M.

8. The method according to claim 1, wherein, for each of the one or more cells, determining the respective second beam reference quality value of the respective cell comprises:

determining the respective second beam reference quality value of the respective cell by filtering based on the respective average value of the at least two largest first beam reference quality values corresponding to the respective cell.

9. The method according to claim 8, wherein the respective second beam reference quality value of the respective cell is determined according to the following relation:

$$Q_t = (1-a) \cdot Q_{t-1} + a \cdot q_t$$

wherein:

"$Q_t$" is a respective filtered second beam reference quality value corresponding to the respective cell, "$q_t$" is a respective average value of the at least two largest first beam reference quality values corresponding to the respective cell, "$Q_{t-1}$" is a respective historical average value of the at least two largest first beam reference quality values corresponding to the respective cell, and "a" is a filtering coefficient.

10. A terminal device, comprising:

a processor, configured to execute a computer instruction to:

determine a first beam reference quality value for each beam of N beams to obtain N first beam reference quality values, wherein N is a positive integer, and the N beams belong to one or more cells of one or more base stations in communication with the terminal device, and wherein the N first beam reference quality values are obtained by performing filtering at a layer higher than a physical layer based on a physical layer measurement result;

select P beams from the N beams based on the N first beam reference quality values, wherein P is a positive integer, and each of the selected P beams belong to a serving cell of the terminal device;

for each of the one or more cells, determine, using the determined N first beam reference quality values, an average value of at least two largest first beam reference quality values among first beam reference quality values of the respective cell;

for each of the cells, after determining the average value of the at least two largest first beam reference quality values among the first beam reference quality values of the respective cell, determine a respective second beam reference quality value of the respective cell using the determined average value corresponding to the respective cell according to the following relation:

$$Q_t=(1-a)\cdot Q_{t-1}+a\cdot q_t$$

, wherein "$Q_t$" is a respective second beam reference quality value corresponding to the respective cell, "$q_t$" is a respective determined average value of the at least two largest first beam reference quality values corresponding to the respective cell, "$Q_{t-1}$" is a respective historical average value of the at least two largest first beam reference quality values corresponding to the respective cell, and "a" is a filtering coefficient; and
    a transceiver, configured to:
        transmit a signal to a network side device that provides a service to the terminal device, to indicate the selected P beams, and to send a respective cell measurement result of each of the one or more cells to the network side device, wherein each respective cell measurement result comprises a respective second beam reference quality value corresponding to the respective cell of the one or more cells;
        receive an indication from the network side device, wherein the indication indicates a random access preamble available to the terminal device, and a time-frequency resource of the random access preamble available to the terminal device corresponds to an index of a beam; and
        send a selected random access preamble on a time-frequency resource corresponding to a first target beam to the network side device, wherein the first target beam is a beam of the P beams that has a largest first beam reference quality value.

11. The terminal device according to claim 10, wherein the processor is further configured to execute the computer instruction to:
    send a radio resource control (RRC) layer message to the network side device, wherein the RRC layer message comprises index values of the selected P beams, wherein the first beam reference quality of each of the selected P beams is greater or equal to a preset threshold.

12. The terminal according to claim 11, wherein the RRC layer message further comprises the cell measurement result of each of the one or more cells.

13. The terminal device according to claim 11, wherein the RRC layer message further comprises the first beam reference quality values of the selected P beams.

14. The terminal device according to claim 11, wherein the processor is further configured to execute the computer instruction to:
    determine, for each beam of the selected P beams, the respective first beam reference quality value corresponding to the respective beam of the selected P beams according to the following relation:

$$R_t=(1-b)\cdot R_{t-1}+b\cdot r_t,$$

$$Q_t=(1-a)\cdot Q_{t-1}+a\cdot q_t$$

wherein:
    $R_t$ is a respective first beam reference quality value corresponding to the respective beam,
    $r_t$ is a respective physical beam reference quality value corresponding to the respective beam,
    $R_{t-1}$ is a respective historical first beam reference quality value corresponding to the respective beam, and
    "b" is a filtering coefficient.

15. The terminal device according to claim 10, wherein the processor is further configured to execute the computer instruction to:
    for each cell to which at least one beam of the N beams belongs, determine, based on the corresponding respective cell measurement result, whether a preset measurement event is met.

16. The terminal device according to claim 10, wherein the terminal device further comprises:
    a receiver, configured to receive a value of M from the network side device, wherein M is a positive integer greater than or equal to 1 and less than or equal to N, and P is less than or equal to M.

17. An apparatus, comprising:
    a processor; and
    a memory storing a program comprising instructions to be executed on the processor, wherein the instructions cause a terminal device to:
        determine a first beam reference quality value for each beam of N beams, to obtain N first beam reference quality values, wherein N is a positive integer, and the N beams belong to one or more cells of one or more base stations in communication with the terminal device, and wherein the N first beam reference quality values are obtained by performing filtering at a layer higher than a physical layer based on a physical layer measurement result;
        select P beams from the N beams based on the N first beam reference quality values, wherein P is a positive integer, and wherein each of the selected P beams belong to a serving cell of the terminal device;
        for each of the one or more cells, determine, using the determined N first beam reference quality values, an average value of at least two largest first beam reference quality values among first beam reference quality values of the respective cell;
        for each of the one or more cells, after determining the average value of the at least two largest first beam reference quality values among the first beam reference quality values of the respective cell, determine a respective second beam reference quality value of the respective cell using the determined average value corresponding to the respective cell;
        indicate the selected P beams to a network-side device that provides a service for the terminal device;
        send a cell measurement result of each of the one or more cells to the network-side device, wherein each respective cell measurement result comprises a respective second beam reference quality value corresponding to the respective cell of the one or more cells;
        receive an indication from the network-side device, wherein the indication indicates a random access preamble available to the terminal device, and a time-frequency resource of the random access preamble available to the terminal device corresponds to an index of a beam; and
        send a selected random access preamble on a time-frequency resource corresponding to a first target beam to the network-side device, wherein the first target beam is a beam of the P beams that has a largest first beam reference quality value.

18. The apparatus according to claim 17, wherein execution of the instructions causes the terminal device to:
  indicate the selected P beams and send the cell measurement result of each of the one or more cells by sending a radio resource control (RRC) layer message to the network-side device, wherein the RRC layer message comprises indexes of the selected P beams, wherein the first beam reference quality of each of the P beams is greater or equal to a preset threshold.

19. The apparatus according to claim 18, wherein the RRC layer message further comprises the respective cell measurement result of each of the one or more cells.

20. The apparatus according to claim 18, wherein the RRC layer message further comprises the first beam quality values of the selected P beams.

21. The apparatus according to claim 18, wherein execution of the instructions further causes the terminal device to:
  determine, for each beam of the selected P beams, the respective first beam reference quality value corresponding to the respective beam of the selected P beams according to the following relation:

$Q_t = (1-a) \cdot Q_{t-1} + a \cdot q_t$ wherein:
  "$Q_t$" is a respective filtered first beam reference quality value corresponding to the respective beam,
  "$q_t$" is a respective physical beam reference quality value corresponding to the respective beam,
  "$Q_{t-1}$" is a respective historical third first beam reference quality value corresponding to the respective beam, and
  "a" is a filtering coefficient.

22. The apparatus according to claim 17, wherein execution of the instructions further causes the terminal device to:
  receive a value of M from the network-side device, wherein M is a positive integer greater than or equal to 1 and less than or equal to N, and wherein P is less than or equal to M.

23. The apparatus according to claim 17, wherein execution of the instructions causes the terminal device to:
  for each of the one or more cells, determine the respective second beam reference quality value of the respective cell by filtering based on the respective average value of the respective at least two largest first beam reference quality values corresponding to the respective cell.

24. The apparatus according to claim 23, wherein execution of the instructions causes the terminal device to determine the respective second beam reference quality value of the respective cell according to the following relation:

$Q_t = (1-a) \cdot Q_{t-1} + a \cdot q_t$ wherein:
  "$Q_t$" is a respective filtered second beam reference quality value corresponding to the respective cell,
  "$q_t$" is a respective average value of the at least two largest first beam reference quality values corresponding to the respective cell,
  "$Q_{t-1}$" is a respective historical average value of the at least two largest first beam reference quality values corresponding to the respective cell, and
  "a" is a filtering coefficient.

* * * * *

UNITED STATES PATENT AND TRADEMARK OFFICE
CERTIFICATE OF CORRECTION

PATENT NO. : 11,233,558 B2
APPLICATION NO. : 16/271214
DATED : January 25, 2022
INVENTOR(S) : Tang et al.

Page 1 of 1

It is certified that error appears in the above-identified patent and that said Letters Patent is hereby corrected as shown below:

In the Claims

Claim 14, Column 35, Lines 60-62; delete "$Q_t=(1-a) \cdot Q_{t-1} + a \cdot q_t$".

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*